United States Patent
Porikli et al.

(10) Patent No.: US 7,027,403 B2
(45) Date of Patent: Apr. 11, 2006

(54) METHOD AND SYSTEM FOR MINIMIZING ERROR IN BANDWIDTH ALLOCATION WITH AN OPTIMAL NUMBER OF RENEGOTIATIONS

(75) Inventors: Fatih M. Porikli, North Plainfield, NJ (US); Zefer Sahinoglu, Clifton, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 916 days.

(21) Appl. No.: 09/862,900

(22) Filed: May 22, 2001

(65) Prior Publication Data

US 2002/0176369 A1    Nov. 28, 2002

(51) Int. Cl.
*H04J 3/14* (2006.01)
*H04L 12/26* (2006.01)

(52) U.S. Cl. .................. 370/238; 370/252; 370/395.41; 709/241

(58) Field of Classification Search ................ 370/235, 370/238, 238.1, 252, 437, 468, 477, 331, 370/232, 412, 230, 395.41; 709/241
See application file for complete search history.

(56) References Cited

U.S. PATENT DOCUMENTS

| | | | | |
|---|---|---|---|---|
| 5,463,620 A | * | 10/1995 | Sriram | 370/412 |
| 5,559,798 A | * | 9/1996 | Clarkson et al. | 370/468 |
| 5,787,077 A | * | 7/1998 | Kuehnel et al. | 370/331 |
| 6,208,640 B1 | * | 3/2001 | Spell et al. | 370/358 |
| 6,269,078 B1 | * | 7/2001 | Lakshman et al. | 370/230 |
| 6,310,857 B1 | * | 10/2001 | Duffield et al. | 370/232 |
| 6,411,946 B1 | * | 6/2002 | Chaudhuri | 706/21 |
| 6,438,141 B1 | * | 8/2002 | Hanko et al. | 370/477 |

* cited by examiner

*Primary Examiner*—Alpus H. Hsu
(74) *Attorney, Agent, or Firm*—Dirk Brinkman; Andrew J. Curtin

(57) ABSTRACT

A method dynamically allocates and renegotiates bandwidth to traffic having a variable data rate in a network. A current data rate and current allocated bandwidth is measured. A future data rate for the traffic is predicted. A cost function is then minimized based on the current data rate, the current allocated bandwidth, and the future data rate to determine a future bandwidth to be allocated for the traffic so that a cost of the renegotiation is minimized over time.

6 Claims, 7 Drawing Sheets

METHOD AND SYSTEM FOR MINIMIZING ERROR IN BANDWIDTH ALLOCATION WITH AN OPTIMAL NUMBER OF RENEGOTIATIONS

FIELD OF THE INVENTION

The present invention relates generally to a method or system for allocating network resources for network traffic, and more particularly to adaptive bandwidth allocation for real-time traffic.

BACKGROUND OF THE INVENTION

An asynchronous transfer mode (ATM) network provides an application program with a QoS connection-oriented service that has guaranteed bandwidths for sending Internet Protocol (IP) packets or "traffic." To send the packets, the application requests a virtual circuit (VC) with an initial bandwidth. After the VC has been allocated to the application, an adaptation layer of the network determines how long to keep the VC open with the initial bandwidth assignment. As long as the sending rate of the packets matches the allocated bandwidth, then the VC is kept open, see H. Saran, S. Keshav, "*An empirical Evaluation of Virtual Circuit Holding Times in IP over ATM Networks,*" Proc. of INFOCOM 1994, Y. Afek, M. Cohen, E. Haalman, Y. Mansour, "*Dynamic Bandwidth Allocation Policies,*" 0743-166X/96 IEEE, and S. K. Biswas, R. Izmailov, "*Design of a fair Bandwidth allocation Policy for VBR Traffic in ATM Networks,*" IEEE/ACM Trans. On Networking, V:8, N:2, April 2000. However, if the application sends packets at a higher or lower rate than the allocated bandwidth, then there is a need to adjust the bandwidth of the allocated VC.

Periodic adaptation processes adjust, i.e., "renegotiate," the allocated bandwidth at fixed time intervals. On the other hand, adaptive processes renegotiate the bandwidth as necessary, as long as the renegotiations are not too frequent. Renegotiating the bandwidth can be done in two ways. The existing VC can be closed, and a new VC can be allocated, or the allocation of the current VC can be adjusted, Y. Afek, M. Cohen, E. Haalman, Y. Mansour, "*Dynamic Bandwidth Allocation Policies,*" 0743-166X/96 IEEE. The later case is preferred because adjusting the bandwidth of an existing VC takes less time than closing and opening the VC.

When the data rate of the traffic fluctuates rapidly it is said to be "bursty." This makes it a problem for a QoS router or server to determine exactly when to renegotiate bandwidth, and what the adjusted bandwidth should be, particularly with real-time traffic, .e.g., a "live" streaming video, at a utilization level greater than 98%.

M. Grossglauser, S. Keshav, and D. Tse, "*RCBR: A Simple and Efficient Service for Multiple Time Scale Traffic,*" in Proc. ACM SIGCOMM'95, pp. 219–230, August 1995, described an off-line method for bandwidth renegotiation. Their method determines an optimal schedule for traffic based on a complete knowledge of the traffic's required data rate over time. They assign a constant cost per renegotiation and per allocated bandwidth unit. That off-line method achieves 99% bandwidth utilization defined as a ratio of the average rate of the original stream to the average of a piecewise constant service rate, with one renegotiation on average every seven seconds. Even though the utilization achieved in that method is very close to 100%, their method cannot be used for renegotiating real-time traffic where a future behavior of the traffic is not known a priori.

Therefore, there is a need for a method and a system for optimally renegotiating bandwidth for real-time network traffic.

SUMMARY OF THE INVENTION

This invention provides in general a method or a system that renegotiates network resources allocated to an application's traffic in dynamic time intervals and optimizes the number of resource renegotiations. In particular, this invention provides a method that assigns predicted portion of the available link capacity to an applications bit stream and based on the time varying characteristics of the bit arrival rate, it renegotiates the allocated bandwidth, meanwhile optimizing the number of bandwidth renegotiations.

More specifically, the invention provides a method for dynamically allocating and renegotiating bandwidth to real-time traffic having a variable data rate in a network. A current data rate and current bandwidth for network traffic is measured. A future data rate for the traffic is predicted based on the measured data rate and bandwidth. A cost function is then minimized based on the current data rate, the current bandwidth, and the future data rate to determine a future bandwidth to be allocated for the traffic so that a cost of the renegotiation is minimized over time.

DETAILED DESCRIPTION OF THE PREFERRED EMBODIMENT

Figure 1:
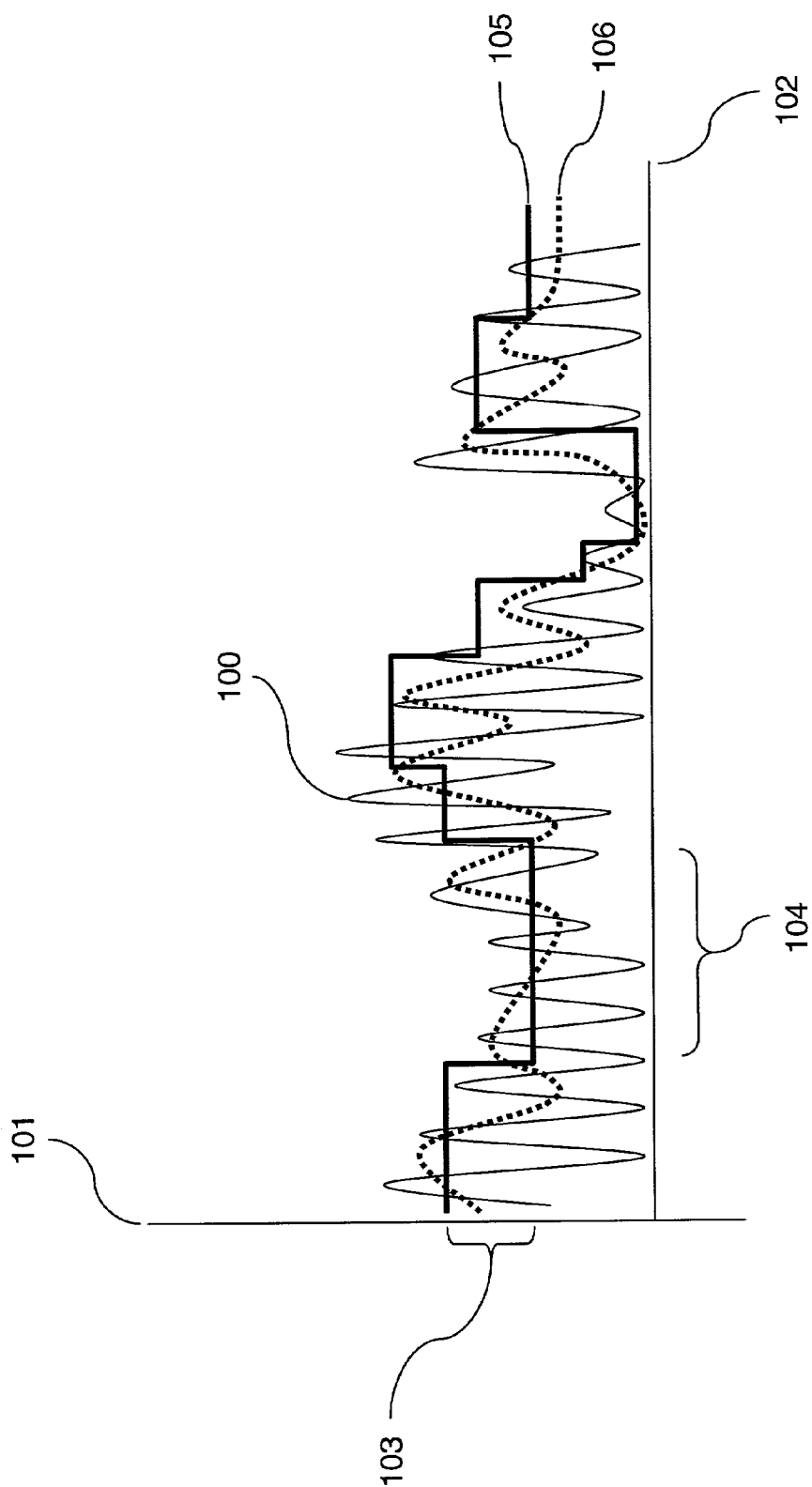
FIG. 1 is a graph of real-time network traffic processed by the invention.

In this description, the following variables and terms are defined n: time
a(n): bandwidth allocation at current time n
r(n): bit arrival rate at time at current time n
p(n+1): predicted bit arrival rate for future time n+1
B: buffer size
w(e): bandwidth cost function
b(n): size of the queue (buffered bits)
u(n): size of the under-utilized bandwidth (bits)
e(n): bandwidth error function (bits)
T(n): cost of renegotiations
J(n): total cost function FIG. 1 shows the problem to be solved by the invention for renegotiating bursty real-time traffic 100. Here, a bit arrival rate r(n) 101 is shown as a function of time n 102. Renegotiation of allocated bandwidth is for a step size 103, over a renegotiation interval 104, where curve 105 is a cost effective allocation of bandwidth, and curve 106 indicates costly continuous bandwidth allocation renegotiations.

Figure 2:
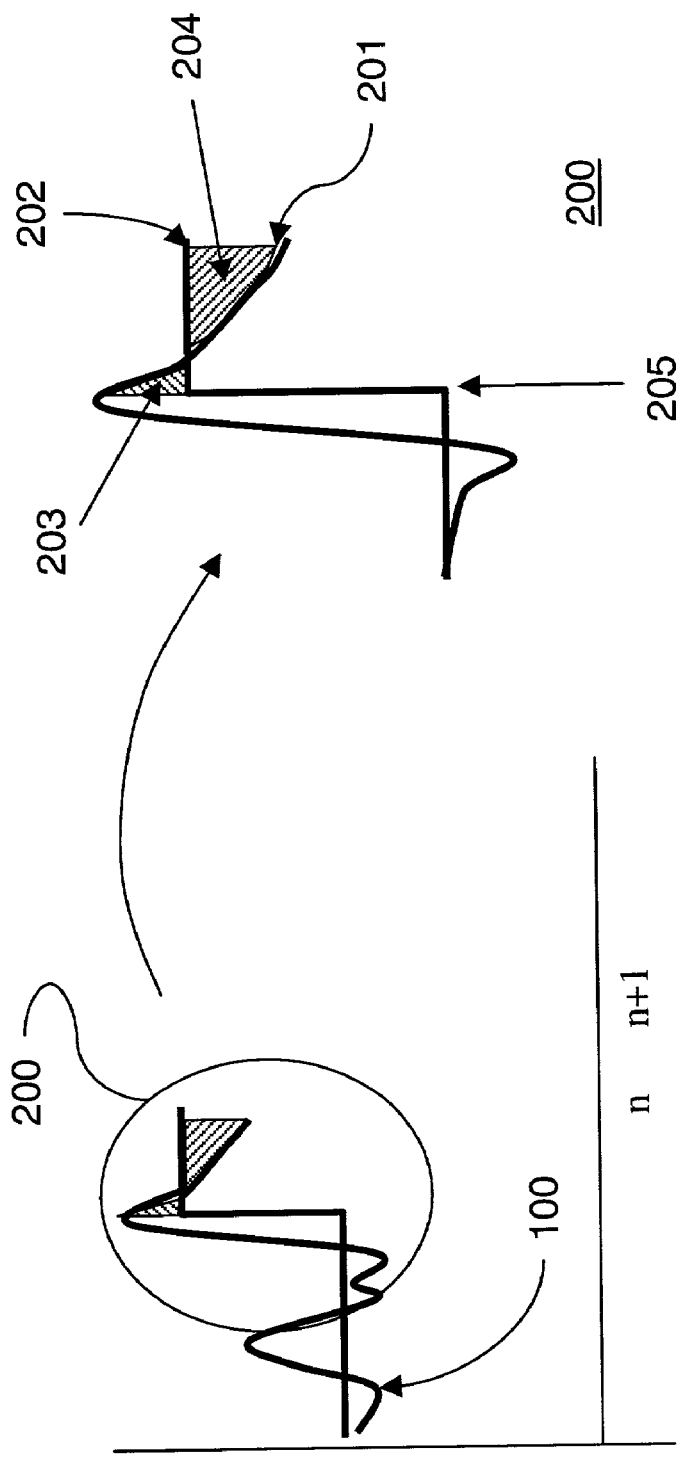
FIG. 2 is a detailed graph of over and under allocation.

FIG. 2 shows details of the renegotiation problems. Bandwidth is renegotiated at time 205 due to buffering (under allocation) 203. The bandwidth is renegotiated to an allocation 202, however, the arrival rate 201 soon drops, causing an under utilization 204.

In order to avoid under allocation and under utilization of the bandwidth, the allocated bandwidth should be adapted as the bit arrival rate r(n) changes to follow-up of the traffic bit rate pattern. However, each renegotiation process involves a signaling between the network and the source of the traffic. High renegotiation frequency loads the network with overhead. On the other hand, long inter-renegotiation intervals make the follow-up of the traffic bit rate pattern difficult. Therefore, an optimal number of bandwidth renegotiations must be provided under constraints such as under utilization cost, renegotiation cost, and maximum buffer size.

Therefore, the invention determines an optimum bandwidth a(n+1) for real-time traffic at a future time n+1 given a current bit arrival rate (number of bits) r(n), and estimated optimum allocated bandwidth a(n) at a current time n.

We determine an optimum bandwidth allocation a(n+1) for real-time traffic at a future time n+1 given a current traffic bit arrival rate r(n), and current allocated bandwidth a(n) at time n. To attain the optimum solution, we design a total cost function J that includes costs of under utilization in terms of u(n), under allocation $$J = w_b b(n) + w_u u(n) + T(n)$$
$$= w(b(n) + u(n)) + T(n)$$
$$= w(e(n)) + T(n)$$

in terms of b(n), and renegotiation as T(n). The cost function J is defined as where the e(n) is the bandwidth error such that In the cost function, the size of the queue b(n) and the size of the under used $$e(n) = \sum_{i=0}^{n}(r(i) - a(i)) + p(n+1) - a(n)$$

bandwidth u(n) are weighted by shaping functions $w_b b$ and $w_u u$, and then added to the cost of renegotiation T(n). Using separate cost terms for under utilization and under allocation enables us to adapt the optimization method for various types of applications; weighted fair queuing (WFQ) processes, ATM switches, etc. In addition, one cost term can be preferred to the other with respect to the changing network conditions, i.e., the buffer cost can have a nonlinear dependence on the current queue size, and cost of bandwidth can be alternating at the certain times of the day. The under allocation happens when the allocated bandwidth is insufficient to handle the bit arrival rate.

In case of under allocation, excess bits are queued in the buffer. The buffered bits are sent when the arrival bit rate is less than the allocated bandwidth, thus, there is available bandwidth to forward bits from buffer. The under utilization u(n) occurs when the allocated bandwidth is greater than the bit arrival rate and the buffer is empty. Therefore, the allocated bandwidth is not fully used.

The bandwidth error function e(n) is u(n) for under utilization, and b(n) for under allocation. The error function also includes the predicted bandwidth error for future time n+1 to include the effect of keeping the same bandwidth allocation level. The bandwidth cost function w(e(n)) corresponds to the under allocation cost when e(n) is greater than zero, and under utilization cost otherwise.

While optimizing J, the renegotiation step a(n+1) and time are obtained. The $$a(n+1) = \arg\min J = \arg\min[w(e(n)) + T(n)]$$

determination for a(n+1) is made by minimizing the cost function

By analyzing the impact of each cost term in the cost function J, the minimization of the cost function can be understood. The renegotiation cost function T(n) should be high when another bandwidth renegotiation was made recently at time n-m, where m is a small time period. By the increasing the value of m, which also means that the last renegotiation was made long past; the cost of renegotiation $$T(n) = \begin{cases} C_1 T(n-1) & a(n) \ne a(n-1) \\ C_2 T(n-1) & a(n) = a(n-1) \end{cases}$$

should be decreasing because renegotiation becomes more affordable. Therefore, the time period m between the current time and the very last renegotiation determines the magnitude of the renegotiation cost function T(n):

The above constants are assigned as $C_1 > 1 > C_2 > 0$. These constants determine severity of the renegotiation cost. If the bandwidth cost function w(e(n)) becomes larger than the renegotiation cost function for the predicted traffic, it becomes advantageous to renegotiate to prevent from the expansion of w(e(n)). In case a constant renegotiation cost is preferred to a variable cost term, the number of renegotiations can increase rapidly if the newly allocated bandwidth is incapable of quickly reducing the under allocation or under utilization costs. The cost function J fluctuates close to the decision boundary. Each time the bandwidth cost function becomes higher than the renegotiation cost, a new renegotiation is made.

Considering the under utilization and under allocation, we form w(e(n)) as $$w(e(n)) = \begin{cases} e(n)^K & e(n) > 0 \\ |e(n)^L| & e(n) \le 0 \end{cases}$$

We choose K>L>1 to increase the weight of under allocation. If no buffer overload is permitted), then w(e(n)) becomes infinity at B by asymptotically converging to the e(n)=B. In the above equations, the cost of bandwidth w(e(n)) is assigned as a combination of polynomial functions. Alternatively, the cost of bandwidth can be defined by a piece-wise continuous function or an exponential function.

Figure 3:
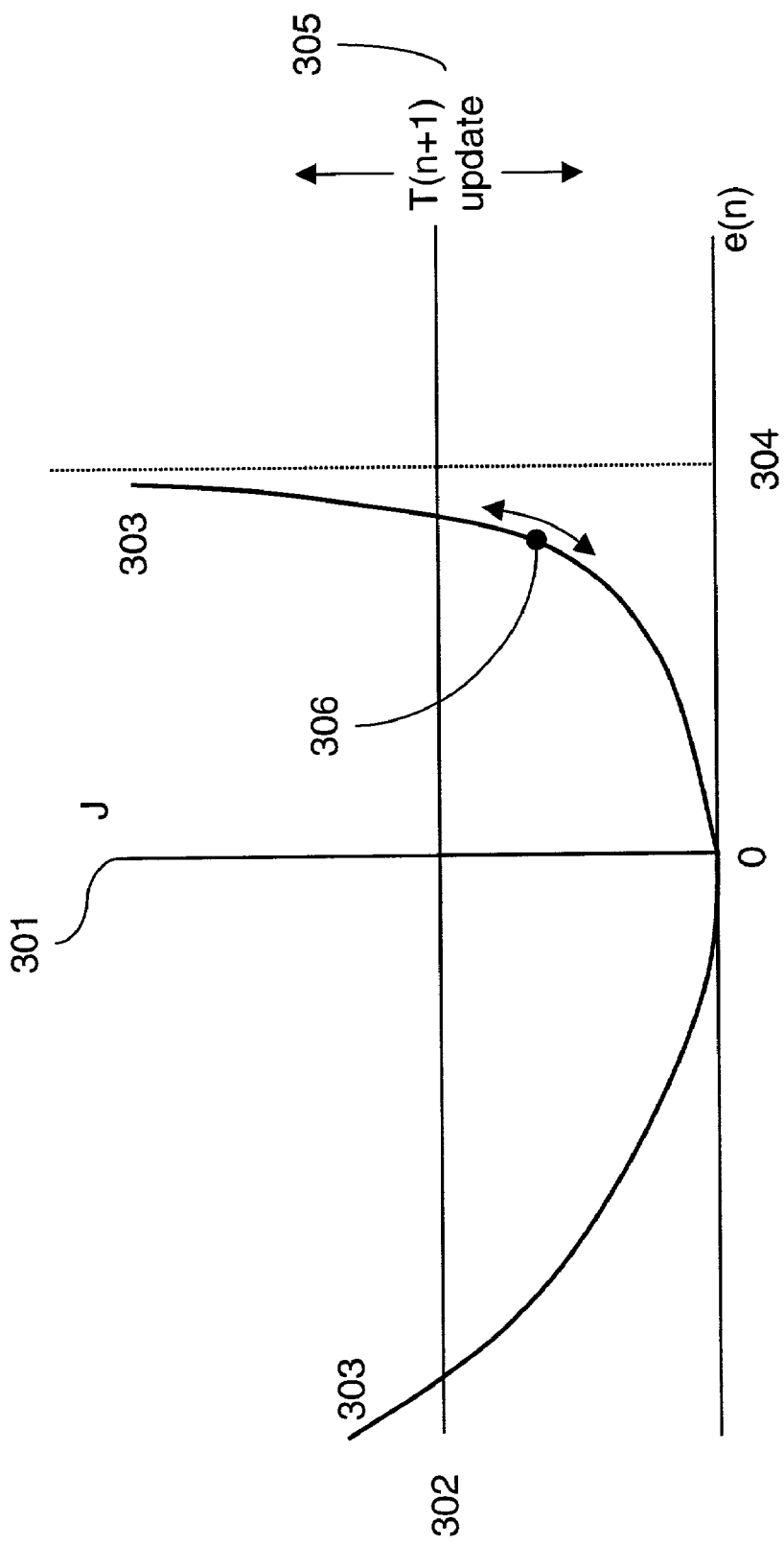
FIG. 3 is a graph of a cost function minimized by the invention.

FIG. 3 show a minimum (0) J 301 as a function of the bandwidth error function e(n) 302, with the bandwidth cost function 303, a buffer size B 304, a current bandwidth cost 306, and an update of the renegotiation cost in the future T(n+1) 305.

Figure 4:
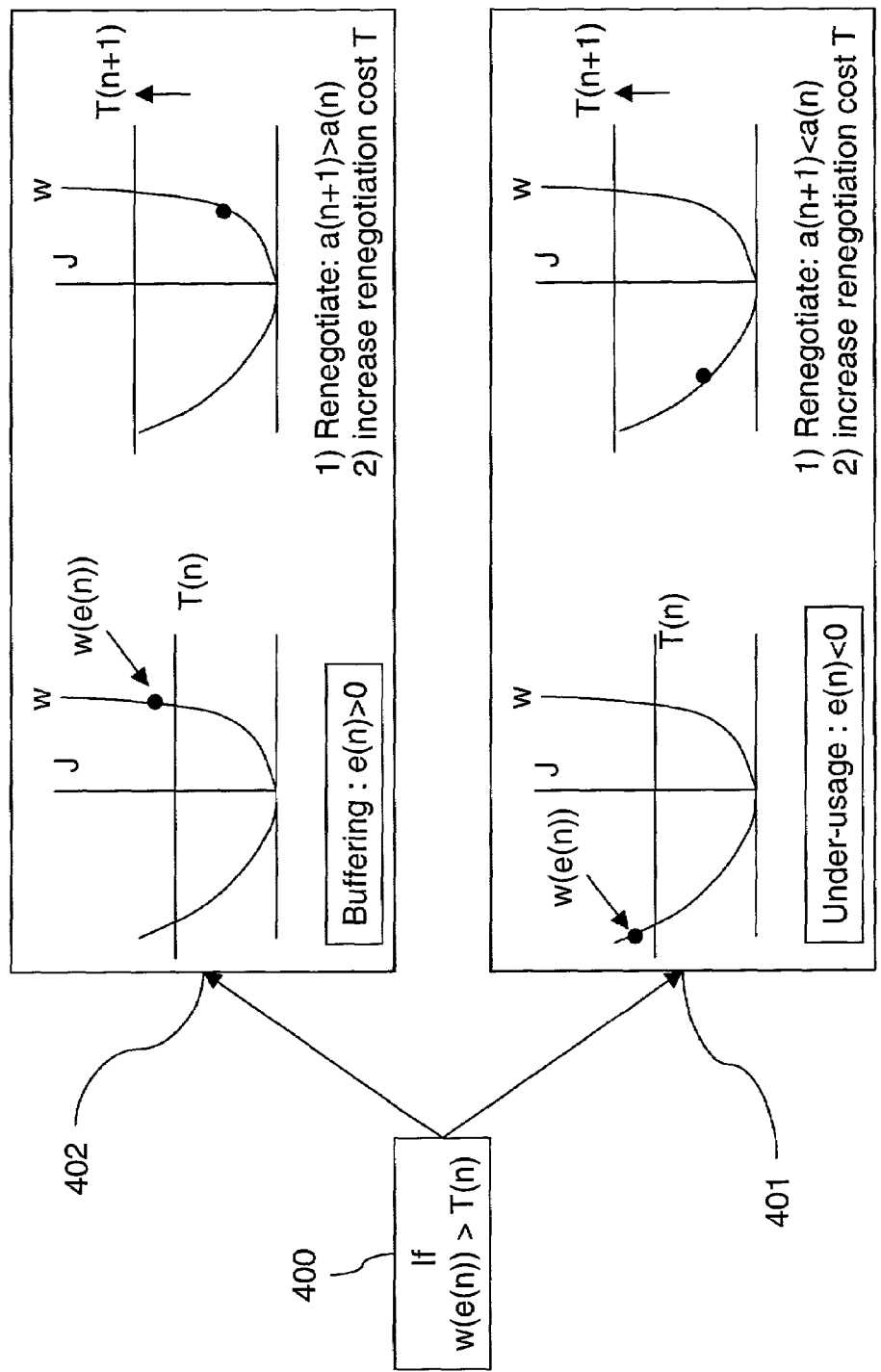
FIG. 4 is a block diagram of over and under allocation with respect to the cost function of FIG. 3.

FIG. 4 shows this more clearly for the case where the bandwidth cost w(e(n)) is greater than the cost T(n) of renegotiation 400. A new renegotiation is made. When e(n)<0 401, the allocated bandwidth is under utilized and less bandwidth should be allocated for the next time instance, and the cost of renegotiation T is increased. When e(n)>0 402, buffering is required due to under allocation, and the bandwidth should be increased, and the cost of renegotiation T is also increased.

Figure 5:
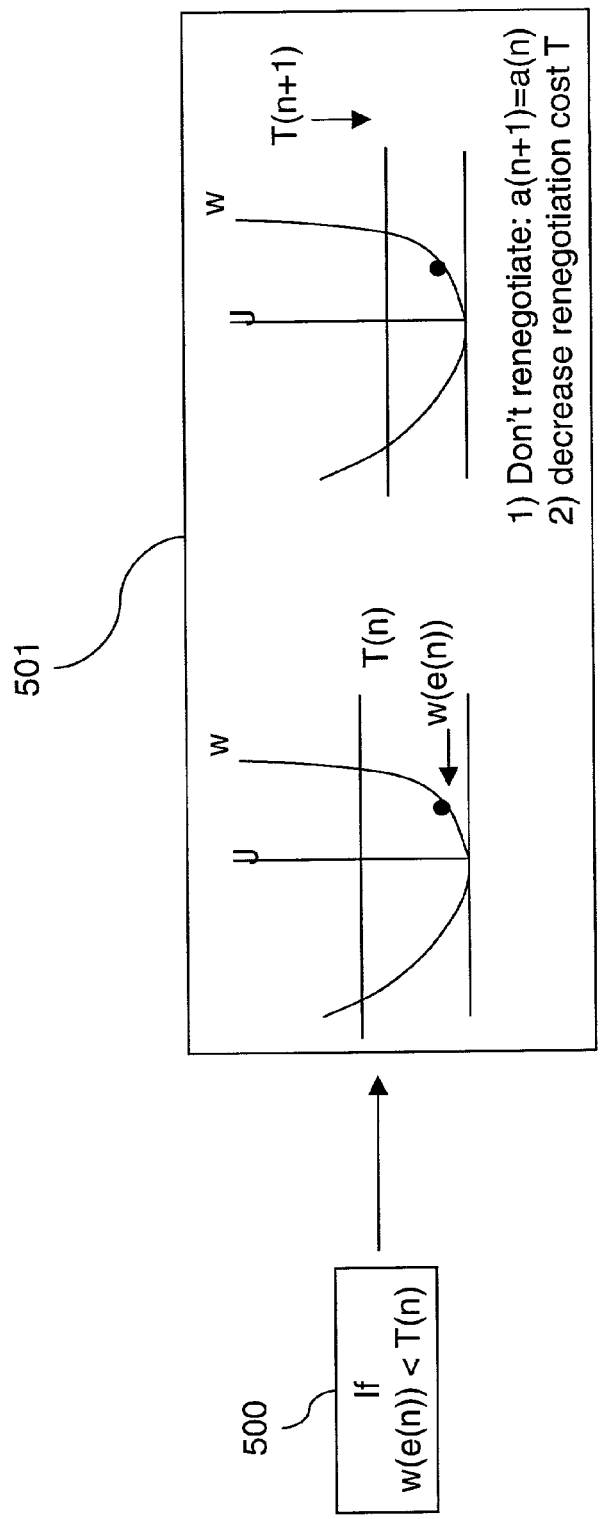
FIG. 5 is a block diagram of decreasing the cost function.

FIG. 5 shows the case where the accumulation function w(e(n)) is less than the cost T(n) of renegotiation 500. In this case 501, the bandwidth should remain the same, and the cost of renegotiation is decreased.

Figure 6:
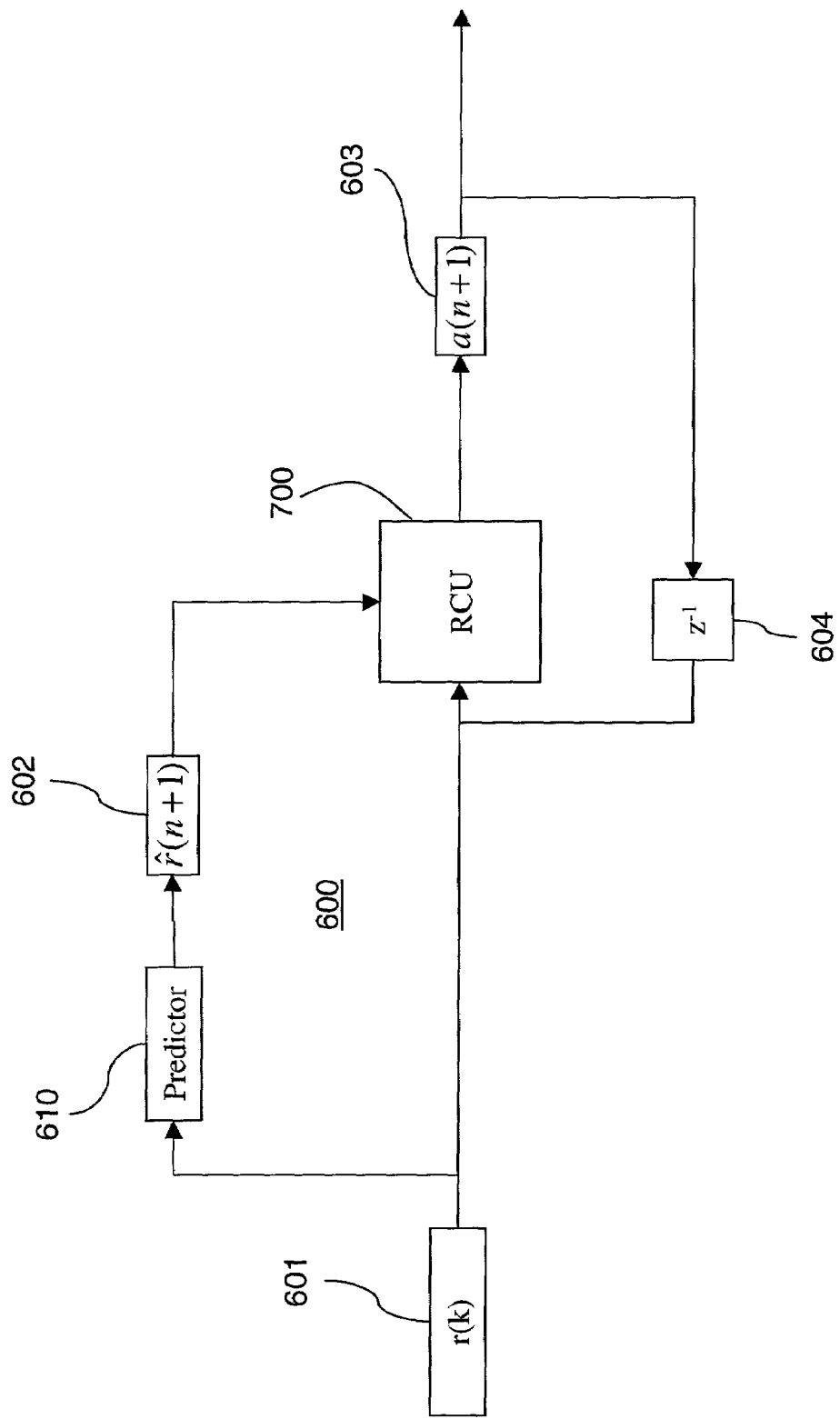
FIG. 6 is a flow diagram of a method for renegotiation according to the invention.

FIG. 6 shows a flow diagram of a method 600 for optimally renegotiating bandwidth for real-time traffic according to the invention. The method receives a bit arrival rate r(n) 601 as input. Based on the arrival rate, a prediction module 610 determines a future arrival rate 602. The prediction can be linear, least mean square, or use a wavelet decomposition method described in U.S. patent application Ser. No. 09/842,973 "*Adaptive Bandwidth Allocation by Wavelet Decomposition and Energy Analysis of Network Traffic*" filed by Sahinoglu on Apr. 26, 2001, incorporated herein by reference.

The predicted future arrival rate 602 is passed to a renegotiation control unit (RCU) 700 to determine a bandwidth allocation 603 at a future time n+1. The future bandwidth allocation is fed back 604, to be used by the RCU 620 during the next renegotiation.

Figure 7:
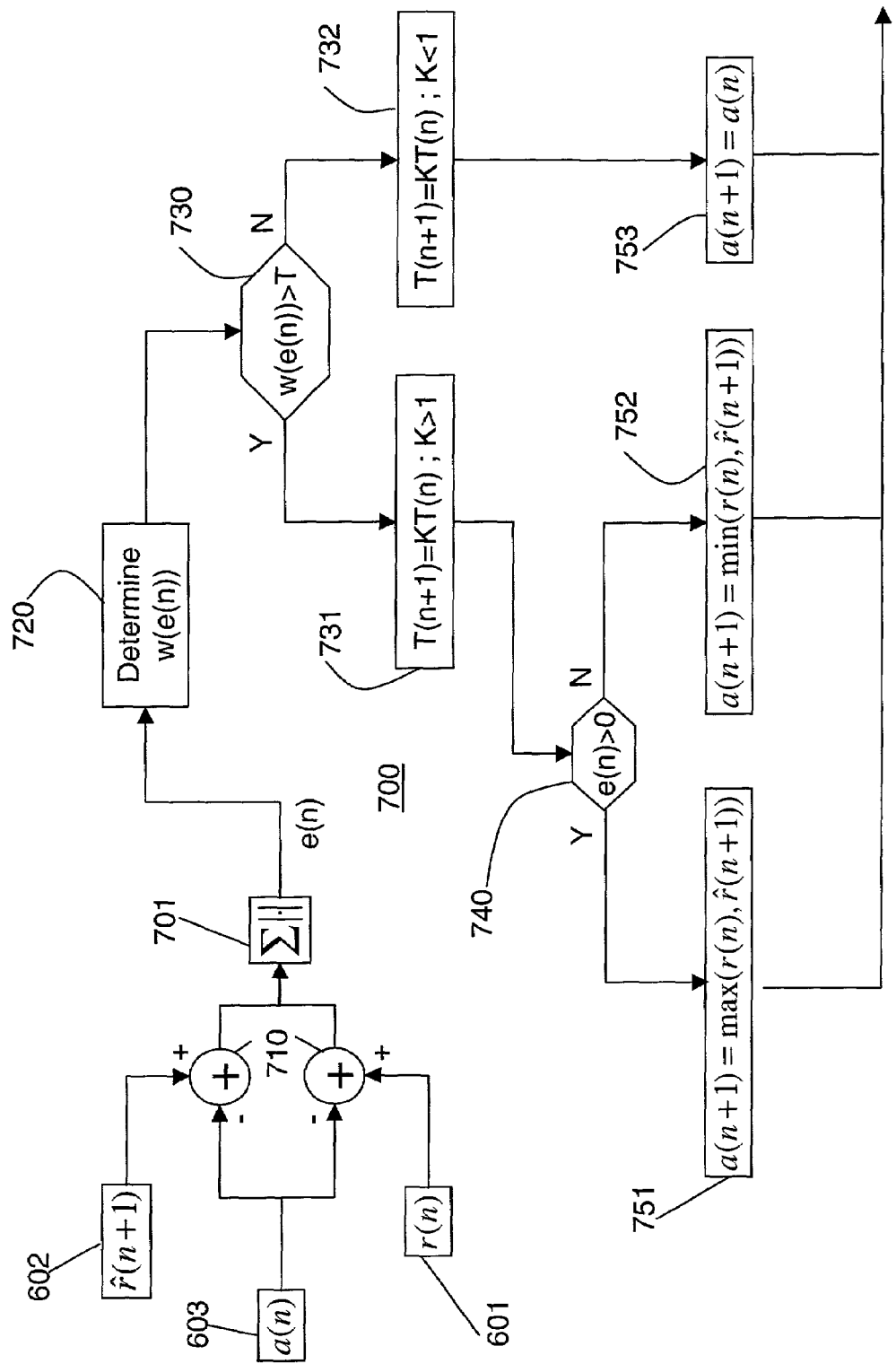
FIG. 7 is a block diagram of a renegotiation control unit according to the invention.

FIG. 7 shows the details of the RCU 700 that achieve the functions shown in FIGS. 3–5. As described above, the RCU takes as input the values 601–603. These values are summed 710 to produce the cumulative cost e(n) 701. Next the weighting function w(e(n)) is determined 720, compared with the cost of renegotiation T, which can either be less then one 731, or greater than one 732.

In the case the cost is less than one 731, a determination 740 is made if the current weighting function is less than or greater than zero. Based on the above determinations, the bandwidth for the next time interval is allocated accordingly in steps 751–753. In step 751, the bandwidth is set (402) to a maximum of either current or future rate. In step 752, the bandwidth is set (401) to a minimum of either current or future rate. In step 753, the bandwidth remains the same (501).

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for dynamically allocating and renegotiating bandwidth to traffic having a variable data rate in a network, comprising:

measuring a current data rate of the traffic in the network;

measuring a current bandwidth allocation of the traffic in the network;

predicting a future data rate for the traffic based on the current data rate and the current bandwidth allocation; and minimizing a cost function based on the current data rate, the current bandwidth allocation, and the future data rate to determine a future bandwidth allocation for the traffic that minimized a cost of the renegotiation bandwidth over time, and in which the cost function is $$J=w_b b(n)+w_u u(n)+T(n)$$

where $w_b b(n)$ is a weighted cost of under allocation, $w_u u(n)$ is a weighted cost of under utilization, and $T(n)$ is a cost of renegotiation the bandwidth.

2. The method of claim 1 further comprising:

determining a renegotiation cost function for the traffic using a time period between a last renegotiation and a current time.

3. The method of claim 2 further comprising:

increasing a value of the renegotiation cost function if the bandwidth is renegotiated at the current time; and decreasing the value of the renegotiation cost function if bandwidth is not renegotiated at the current time.

4. The method of claim 1 further comprising:

assigning a first cost functions for an under allocation of bandwidth;

assigning a second cost function to the renegotiation; and assigning a third cost function for under utilization of the bandwidth.

5. The method of claim 4 further comprising:

bounding the first cost function to a size of a buffer used to store the traffic during the under allocation of the traffic.

6. A system for dynamically allocating and renegotiating bandwidth to traffic having a variable data rate in a network, comprising:

a predictor configured to predict a future data rate for the traffic based on a measured current data rate and a measured current bandwidth allocation; and a renegotiation control unit configured to minimize a cost function based on the current data rate, the current bandwidth allocation, and the future data rate to determine a future bandwidth allocation for the traffic that minimized a cost of the renegotiation bandwidth over time, in which the cost function is $$J=w_b b(n)+w_u u(n)+T(n)$$

where $w_b b(n)$ is a weighted cost of under allocation, $w_u u(n)$ is a weighted cost of under utilization, and $T(n)$ is a cost of renegotiation the bandwidth.

* * * * *